United States Patent
Sakakibara et al.

(10) Patent No.: US 12,420,764 B2
(45) Date of Patent: Sep. 23, 2025

(54) ELECTRIC BRAKING DEVICE

(71) Applicant: ADVICS CO., LTD., Kariya (JP)

(72) Inventors: Yuichi Sakakibara, Kariya (JP); Ryota Maeno, Kariya (JP); Atsushi Takahashi, Kariya (JP); Tsuyoshi Otake, Kariya (JP); Shingo Onoda, Kariya (JP); Haruo Arakawa, Kariya (JP)

(73) Assignee: ADVICS CO., LTD., Kariya (JP)

( * ) Notice: Subject to any disclaimer, the term of this patent is extended or adjusted under 35 U.S.C. 154(b) by 8 days.

(21) Appl. No.: 18/690,119

(22) PCT Filed: Sep. 27, 2022

(86) PCT No.: PCT/JP2022/036001
§ 371 (c)(1),
(2) Date: Mar. 7, 2024

(87) PCT Pub. No.: WO2023/048297
PCT Pub. Date: Mar. 30, 2023

(65) Prior Publication Data
US 2024/0375629 A1   Nov. 14, 2024

(30) Foreign Application Priority Data

Sep. 27, 2021 (JP) .................... 2021-156613
Sep. 13, 2022 (JP) .................... 2022-145319

(51) Int. Cl.
*B60T 13/74* (2006.01)
(52) U.S. Cl.
CPC ......... *B60T 13/741* (2013.01); *B60Y 2400/81* (2013.01)

(58) Field of Classification Search
CPC ...... B60T 13/74; B60T 13/148; B60T 13/745; B60T 13/741; B60T 2270/406;
(Continued)

(56) References Cited

U.S. PATENT DOCUMENTS 11,001,166 B2 * 5/2021 Masuda ............... F16D 61/00
2018/0073585 A1 * 3/2018 Masuda ............... F16D 55/226
(Continued)

FOREIGN PATENT DOCUMENTS

DE        102018214188 A1    2/2020

OTHER PUBLICATIONS

International Search Report (PCT/ISA/210) with English translation and Written Opinion (PCT/ISA/237) mailed on Nov. 15, 2022, by the Japanese Patent Office as the International Searching Authority for International Application No. PCT/JP2022/036001.

*Primary Examiner* — Hai H Huynh
*Assistant Examiner* — Johnny H Hoang
(74) *Attorney, Agent, or Firm* — BUCHANAN INGERSOLL & ROONEY PC

(57) ABSTRACT

An electric braking device generates a braking force at a wheel via application of a pressing force by a piston by linear motion of the piston in response to the transmission of a forward-direction rotational torque from an electric motor to a linear motion conversion mechanism. The electric braking device is provided with a one-way clutch that cuts off the transmission of a rotational torque between the electric motor and the linear motion conversion mechanism when applied with a rotational torque in a direction opposite to the forward direction and having a magnitude equal to or greater than a predetermined value.

12 Claims, 6 Drawing Sheets

(58) Field of Classification Search
CPC ...... B60T 17/22; B60T 13/746; B60T 13/662; B60T 1/065; B60T 8/96; B60T 17/221; B60T 8/17; F16D 43/20; F16D 55/226; F16D 65/18; F16D 2066/005; F16D 2121/24; F16D 2125/40; B60Y 2400/81
USPC .................................................. 701/70–80
See application file for complete search history.

(56) References Cited

U.S. PATENT DOCUMENTS

2019/0128353 A1\* 5/2019 Al-Mahshi .............. F16D 65/18
2021/0197784 A1 7/2021 Drumm
2022/0355771 A1\* 11/2022 Fujita ..................... B60T 17/22

\* cited by examiner

ELECTRIC BRAKING DEVICE

TECHNICAL FIELD

The present disclosure relates to an electric braking device that generates a braking force by power of an electric motor.

BACKGROUND ART

An electric braking device that generates a braking force by a linear motion of a piston in a cylinder powered by an electric motor is known. Examples of the electric braking device include a wet type electric braking device that transmits pressing force of the piston to a friction member via a brake fluid to generate braking force, and a dry type electric braking device that directly transmits pressing force of the piston to the friction member to generate braking force.

In such electric braking device, when the electric motor loses power due to a power failure or the like during generation of the braking force, the piston is pushed back. Then, the durability of the components of the electric braking device may be impaired by the impact when the piston runs into the end of the linear motion range in the cylinder. On the other hand, Patent Literature 1 describes an electric braking device including a clutch mechanism for protecting a component from such impact. The clutch mechanism included in the electric braking device of Patent Literature 1 cuts off the power transmission path between the electric motor and the linear motion conversion mechanism when the piston in the cylinder is pushed back beyond a predetermined position.

CITATIONS LIST

Patent Literature

Patent Literature 1: German Patent Application Publication No. 102018214188

SUMMARY

Technical Problems

When the clutch mechanism as described above is provided, it is possible to protect the components of the electric braking device from the impact. However, there is a case where such clutch mechanism cannot be adopted in terms of installation space and component cost.

Solutions to Problems

An electric braking device for solving the above problems generates a braking force on a vehicle by transmitting a rotational torque generated by an electric motor to a linear motion conversion mechanism, converting the rotational torque into a propulsive force in a linear direction of a piston provided in a cylinder by the linear motion conversion mechanism, and pressing a friction material that operates in response to the propulsive force of the piston against a rotating portion that rotates together with a wheel of the vehicle. The electric braking device includes a torque transmission mechanism that mutually transmits the rotational torque between the electric motor and the linear motion conversion mechanism, the torque transmission mechanism cutting off transmission of the rotational torque when a rotational torque in a separation direction in which the friction material separates from the rotating portion has a magnitude equal to or greater than a predetermined value.

In the electric braking device, when the electric motor generates a rotational torque, the rotational torque is transmitted to the linear motion conversion mechanism. The transmitted rotational torque is converted into a propulsive force for linearly moving the piston by the linear motion conversion mechanism. Then, a friction material that operates in response to the propulsive force of the piston is pressed against the rotating portion, thereby generating a braking force on the wheel. The piston during generation of the braking force is applied with a reaction force balanced with the pressing force of the friction material against the rotating portion. In the following description, the linear motion of the piston in the direction of pressing the friction material against the rotating portion is referred to as forward motion of the piston, and the linear motion of the piston in the direction of separating the friction material from the rotating portion is referred to as rearward motion of the piston.

When the electric motor loses power due to a power failure or the like during generation of the braking force, the piston is pushed down and moves rearward by the reaction force. The linear motion of the piston in the rearward motion direction at this time is converted into a rotational motion by the linear motion conversion mechanism. Due to this, the rotating components on the torque transmission path between the electric motor and the linear motion conversion mechanism rotate together.

When the piston is pushed down until it runs into the end of the linear motion range in the cylinder, the piston stops operating. Stopping the piston during rearward motion requires energy equivalent to the total kinetic energy of the piston and the members moving in conjunction with the piston. Therefore, when the piston is stopped, an impact having energy equivalent to the total kinetic energy is generated.

On the other hand, the torque transmission path between the electric motor and the linear motion conversion mechanism in the electric braking device is provided with a torque transmission mechanism that cuts off transmission of the rotational torque when the rotational torque in the separation direction in which the friction material separates from the rotating portion has a magnitude equal to or greater than a predetermined value. Even when the piston runs into the end of the linear motion range and stops the rearward motion, each rotating component on the torque transmission path is toward continuous rotation. Therefore, the torque transmission mechanism at this time is applied with the rotational torque in the separation direction. Due to this, when the torque transmission mechanism cuts off the transmission of the rotational torque, the number of members that stop the motion together with the piston decreases. Then, the kinetic energy converted into the impact when the piston is stopped decreases accordingly. Therefore, according to the electric braking device, the impact generated by the power loss of the electric motor during generation of the braking force can be mitigated.

DESCRIPTION OF EMBODIMENTS

First Embodiment

Hereinafter, the first embodiment of the electric braking device will be described with reference to FIGS. 1 to 4.
<Configuration of Electric Braking Device 10>

Figure 1:
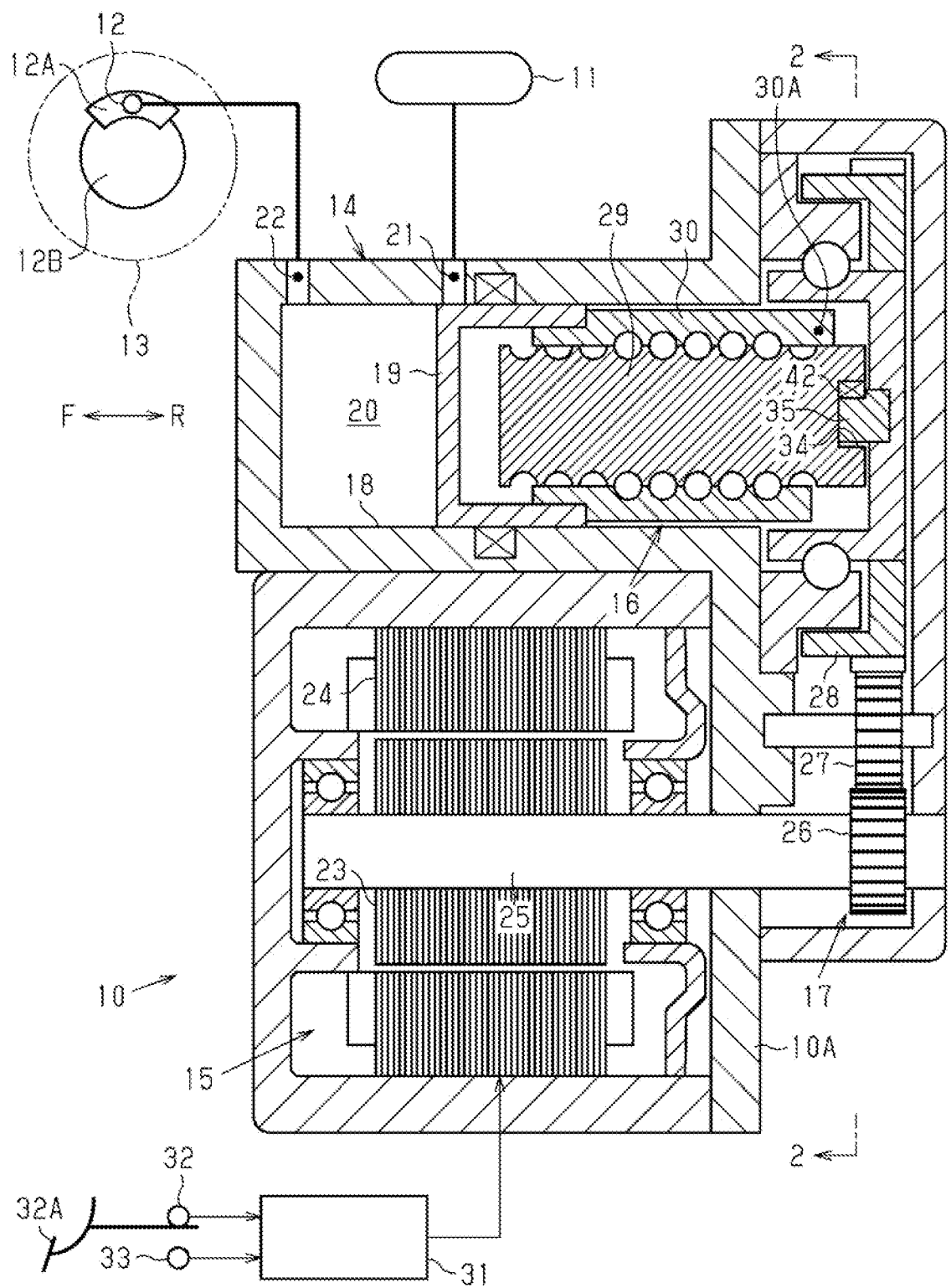
FIG. 1 is a view schematically illustrating a configuration of a first embodiment of an electric braking device.

As illustrated in FIG. 1, an electric braking device 10 is connected to a reservoir tank 11 and a wheel cylinder 12. The reservoir tank 11 is a tank that stores a brake fluid. The electric braking device 10 generates a liquid pressure of the wheel cylinder 12. The wheel cylinder 12 generates a braking force on a wheel 13 of a vehicle by operating a friction material 12A in response to generation of the liquid pressure and pressing the friction material 12A against a brake disc 12B, which is a rotating portion rotating together with the wheel 13.

The electric braking device 10 includes a cylinder mechanism 14, an electric motor 15, a linear motion conversion mechanism 16, and a rotation transmission mechanism 17. The rotation transmission mechanism 17 decelerates and transmits, to the linear motion conversion mechanism 16, the rotation of the electric motor 15. The linear motion conversion mechanism 16 converts the rotational torque generated by the electric motor 15 transmitted through the rotation transmission mechanism 17 into a propulsive force in a linear direction of a piston 19 incorporated in the cylinder mechanism 14. The cylinder mechanism 14, the electric motor 15, the linear motion conversion mechanism 16, and the rotation transmission mechanism 17 are accommodated in a housing 10A.

The cylinder mechanism 14 includes a cylinder 18 formed in the housing 10A and the piston 19 disposed in the cylinder 18 in a linearly movable manner. In the cylinder 18, a liquid chamber 20 into which the brake fluid is introduced is defined and formed by the piston 19. The volume of the liquid chamber 20 changes in response to the movement of the piston 19 in the cylinder 18. In the following description, the movement of the piston 19 in a direction of reducing the volume of the liquid chamber 20 is referred to as forward motion of the piston 19. The movement of the piston 19 in a direction of increasing the volume of the liquid chamber 20 is referred to as rearward motion of the piston 19. Furthermore, of the linear motion direction of the piston 19, the forward motion side of the piston 19 is referred to as a forward motion direction F, and the rearward motion side of the piston 19 is referred to as a rearward motion direction R.

In the cylinder 18, two ports of an input port 21 and an output port 22 are formed as ports that communicate the liquid chamber 20 with the outside. The liquid chamber 20 is connected to the reservoir tank 11 through the input port 21. The liquid chamber 20 is connected to the wheel cylinder 12 through the output port 22. The output port 22 is formed so as to maintain a state of communicating with the liquid chamber 20 regardless of the movement position of the piston 19 in the cylinder 18. On the other hand, in the input port 21, when the piston 19 moves forward by a certain amount or more from the rearmost position, communication with the liquid chamber 20 is blocked by the piston 19. In the following description, a movement position of the piston 19 in which the state where the input port 21 communicates with the liquid chamber 20 and the state where that communication is blocked by the piston 19 are switched is referred to as an initial position.

The electric motor 15 includes a rotor 23 and a stator 24. A motor shaft 25 is coupled to the rotor 23 so as to rotate integrally. On the other hand, the rotation transmission mechanism 17 includes three spur gears of a first gear 26 fixed to the motor shaft 25, a second gear 27 meshed with the first gear 26, and a third gear 28 meshed with the second gear 27. As the third gear 28, a gear larger in number of teeth than the first gear 26 is used. Rotation of the electric motor 15 is input to the linear motion conversion mechanism 16 through the third gear 28.

The linear motion conversion mechanism 16 is a ball screw mechanism including a screw shaft 29 and a nut 30 that linearly moves in response to rotation of the screw shaft 29. The nut 30 is coupled to the piston 19. The screw shaft 29 is connected to the third gear 28 via a coupling member 35. The coupling member 35 is coupled so as to rotate integrally with the third gear 28. On the other hand, a coupling part between the screw shaft 29 and the coupling member 35 is provided with a one-way clutch 42 Although described in detail later, the one-way clutch 42 cuts off the transmission of the rotational torque between the screw shaft 29 and the coupling member 35 when applied with a rotational torque in the direction opposite to a forward direction having a magnitude equal to or greater than a predetermined value TR. Note that the forward-direction rotational torque here represents a rotational torque in a direction in which the piston 19 moves forward. In the following description, a rotational torque in a direction opposite to the forward direction is referred to as a rearward-direction rotational torque.

Note that when the piston 19 moves forward, the liquid pressure of the wheel cylinder 12 increases, and the friction material 12A is pressed against the brake disc 12B. On the other hand, when the piston 19 moves rearward, the liquid pressure of the wheel cylinder 12 decreases, and the friction material 12A separates from the brake disc 12B. Therefore, the rearward-direction rotational torque is the rotational torque in the separation direction in which the friction material 12A separates from the brake disc 12B.

Note that a stopper 30A protruding in the rearward motion direction R is formed in the nut 30. An end in the rearward motion direction R in the linear motion range of the piston 19 in the cylinder 18 is a position in which the stopper 30A of the nut 30 abuts on the third gear 28. In the following description, the position of the piston 19 in which the stopper 30A of the nut 30 abuts on the third gear 28 is referred to as a rearmost position of the piston 19.

Furthermore, the electric braking device 10 includes a control unit 31. The control unit 31 is an electronic control device including one or a plurality of processors that execute various types of control and a memory that stores a control program and data. A detection signal of a stroke 32 sensor that detects a pedal stroke S, which is a depression amount of a brake pedal 32A, is input to the control unit 31. A detection signal of a liquid pressure sensor 33 that detects an output liquid pressure P, which is a liquid pressure output to the wheel cylinder 12 by the electric braking device 10, is also input to the control unit 31.

In the electric braking device 10, when the electric motor 15 generates a forward-direction rotational torque, the linear motion conversion mechanism 16 converts the forward-direction rotational torque into a propulsive force of the piston 19 in the forward motion direction F. When such propulsive force is applied, the piston 19 moves forward in the cylinder 18 and presses the brake fluid in the liquid chamber 20. When the piston 19 presses the brake fluid in the liquid chamber 20 to generate the liquid pressure of the wheel cylinder 12, the electric braking device 10 generates the braking force on the wheel 13. The control unit 31 controls the braking force generated in the wheel 13 by adjustment of the forward-direction rotational torque generated by the electric motor 15. Specifically, when controlling the braking force, the control unit 31 first determines a target liquid pressure, which is a target value of the output liquid pressure P, based on the pedal stroke S and the like. Subsequently, the control unit 31 calculates a current value of the electric motor 15 at which the output liquid pressure P equivalent to the target liquid pressure is obtained, and flows a current equivalent to the calculated value to the electric motor 15. Furthermore, the control unit 31 performs feedback adjustment on the current value of the electric motor 15 based on a deviation between a detection value of the output liquid pressure P and the target liquid pressure.

<Configuration of One-Way Clutch 42>

Next, the configuration of the one-way clutch 42 interposed between the screw shaft 29 of the linear motion conversion mechanism 16 and the coupling member 35 will be described also with reference to FIGS. 2 to 4.

Figure 2:
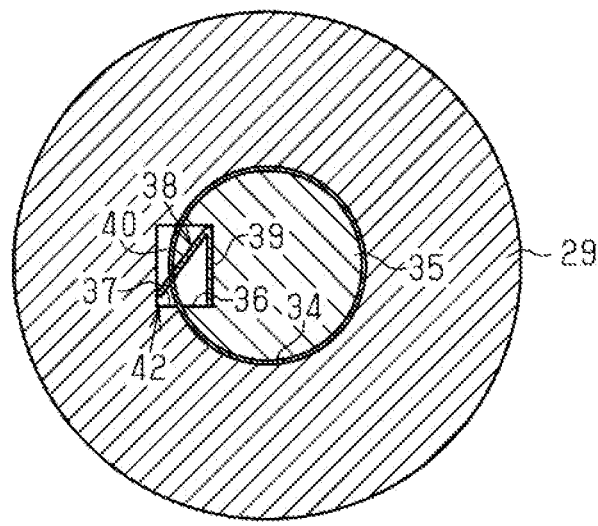
FIG. 2 is a cross-sectional view of a screw shaft and a coupling member taken along line 2-2 in FIG. 1.

FIG. 2 illustrates a cross-sectional structure of the screw shaft 29 and the coupling member 35 taken along line 2-2 in FIG. 1. As illustrated in FIG. 2, an insertion hole 34 having a cylindrical shape is formed in an end surface in the rearward motion direction R of the screw shaft 29. The screw shaft 29 and the coupling member 35 are assembled to the electric braking device 10 in a state where the end part of the coupling member 35 is inserted into the insertion hole 34. A key groove 37, which is a groove having a rectangular cross section and extending in the linear motion direction of the piston 19, is formed on an inner periphery of the insertion hole 34. A key groove 36 that is similar is also formed on an outer periphery of the coupling member 35. Note that the third gear 28 is coupled to the coupling member 35 so as to rotate integrally through engagement with the key groove 37.

A leaf spring 38 is installed in the key groove 36 of the coupling member 35. The leaf spring 38 is a metal plate bent in a V shape, and includes a fixed part 39 fixed to the key groove 36 and a movable part 40 folded upright from the fixed part 39. In the following description, the rotation direction of the screw shaft 29 to a side on which the piston 19 moves forward is a forward rotation direction, and the rotation direction of the screw shaft 29 opposite to the forward rotation direction is a reverse rotation direction. In the case of FIGS. 2 to 4, the counterclockwise direction in the drawings is the forward rotation direction. The leaf spring 38 is installed such that a bent part between the fixed part 39 and the movable part 40 is positioned near a side wall of the key groove 36 in the reverse rotation direction. The leaf spring 38 is formed such that the tip end part of the movable part 40 protrudes out of the key groove 36 in a state where the movable part 40 is applied with no external force. Therefore, when the relative rotational position of the screw shaft 29 with respect to the coupling member 35 is at a predetermined position in which both the key grooves 36 and 37 face each other, the tip end part of the movable part 40 protrudes into the key groove 37. Due to this, the leaf spring 38 installed in the key groove 36 of the coupling member 35 is engaged with the key groove 37 of the screw shaft 29.

Figure 3:
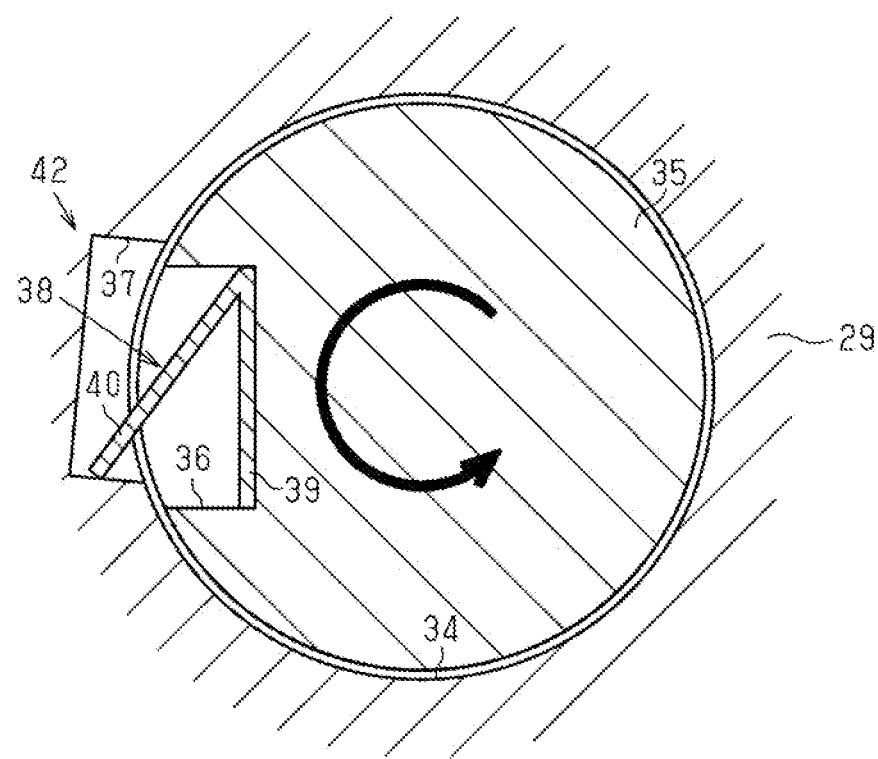
FIG. 3 is a cross-sectional view illustrating a state at the time of braking force generation of a one-way clutch included in the embodiment.

FIG. 3 illustrates a state of the one-way clutch 42 when the coupling member 35 rotates in the forward rotation direction. As illustrated in FIG. 3, when the coupling member 35 rotates in the forward rotation direction relative to the screw shaft 29, the tip end part of the movable part 40 of the leaf spring 38 abuts on the side wall in the forward rotation direction of the key groove 37 of the screw shaft 29. Due to this, the leaf spring 38 is brought into a state of being engaged with the key groove 37. In this state, the forward-direction rotational torque is transmitted from the coupling member 35 to the screw shaft 29 through the leaf spring 38.

Figure 4:
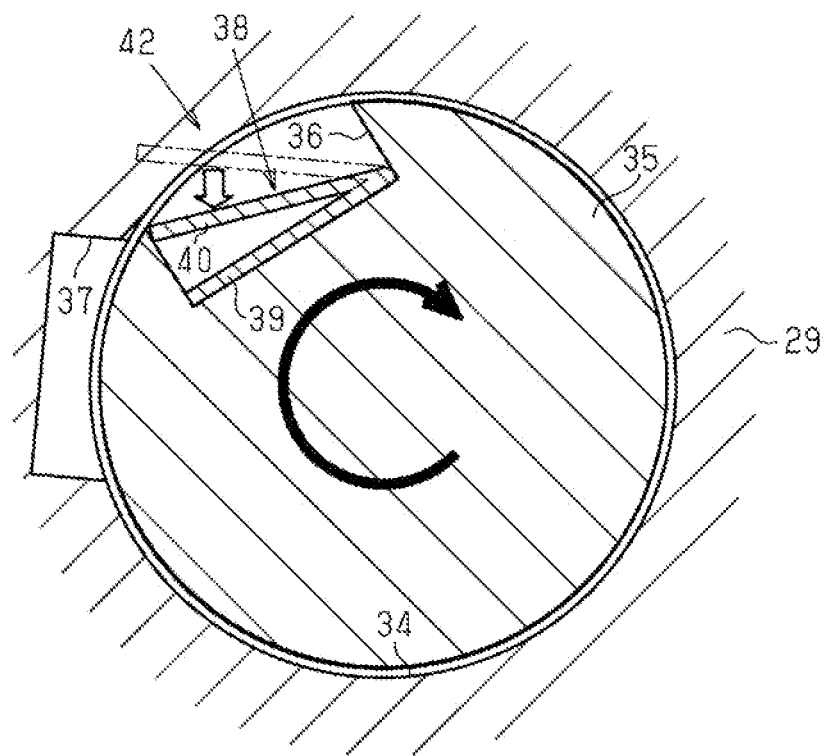
FIG. 4 is a cross-sectional view illustrating a state at the time of input of the rotational torque in the separation direction in the one-way clutch.

FIG. 4 illustrates a state of the one-way clutch 42 when the coupling member 35 rotates in the reverse rotation direction. When the coupling member 35 rotates in the reverse rotation direction relative to the screw shaft 29, the movable part 40 of the leaf spring 38 is pushed down by the side wall in the reverse rotation direction of the screw shaft 29 of the key groove 37. While a part of the movable part 40 remains in the key groove 37 of the screw shaft 29, the rearward-direction rotational torque is transmitted from the coupling member 35 to the screw shaft 29 through the leaf spring 38. On the other hand, when the movable part 40 is pushed down until the movable part completely separates from the key groove 37 of the screw shaft 29, the engagement of the leaf spring 38 with the key groove 37 is released, and therefore the rotational torque is not transmitted through the leaf spring 38. Thus, when applied with the rearward-direction rotational torque equal to or greater than the predetermined value TR, the one-way clutch 42 cuts off the transmission of the rotational torque between the screw shaft 29 and the coupling member 35, and eventually between the electric motor 15 and the linear motion conversion mechanism 16.

<Operations and Effects of First Embodiment>

Operations and effects of the present embodiment will be described.

The electric braking device 10 generates a braking force on the wheel 13 by applying a pressure force to the brake fluid in the liquid chamber 20 by the linear motion of the piston 19 in response to the transmission of the forward-direction rotational torque from the electric motor 15 to the linear motion conversion mechanism 16. When the electric motor 15 loses power due to a power failure or the like during generation of the braking force, the piston 19 is pushed down and moves rearward by the liquid pressure of the liquid chamber 20. The linear motion of the piston 19 in the rearward motion direction R at this time is converted into a rotational motion by the linear motion conversion mechanism 16. The rotating components on the torque transmission path of the electric motor 15 and the linear motion conversion mechanism 16 rotate together in response to the rearward motion of the piston 19. That is, the first gear 26, the second gear 27, and the third gear 28 of the rotation transmission mechanism 17, and the rotor 23 and the motor shaft 25 of the electric motor 15 rotate in the reverse rotation direction in conjunction with the rearward motion operation of the piston 19.

When the piston 19 moves rearward until the rearmost position and the stopper 30A runs into the third gear 28, the piston 19 stops the rearward motion operation. On the other hand, each of the rotating components is toward continuous rotation in the reverse rotation direction due to inertia. Therefore, the one-way clutch 42 is applied with the rearward-direction rotational torque. When the one-way clutch 42 cuts off the transmission of the rotational torque due to the rearward-direction rotational torque, the rotating component in which the torque transmission with the piston 19 is maintained is only two members with the screw shaft 29. That is, the member that stops the motion together with the stopping of the rearward motion of the piston 19 is only the screw shaft 29 and the nut 30 that stops simultaneously with the piston 19.

On the other hand, stopping of the rearward motion of the piston 19 requires energy equivalent to the total kinetic energy of the piston 19 and all the members moving in conjunction with the piston 19. Therefore, when the piston is stopped, an impact having energy equivalent to the total kinetic energy is generated. On the other hand, in the present embodiment, since the one-way clutch 42 cuts off transmission of the rotational torque, the number of members that stop the motion together with the stopping of the rearward motion of the piston 19 decreases, and the mass of the components that stop the motion decreases. Then, the kinetic energy converted into the impact at the time of stopping of the rearward motion of the piston 19 decreases accordingly. Therefore, according to the electric braking device 10 of the present embodiment, it is possible to mitigate the impact generated by power loss of the electric motor 15 during generation of the braking force.

Note that in the present embodiment, the leaf spring 38 made of a plate member folded in a V shape constitutes the one-way clutch 42. Since the one-way clutch 42 has a simple configuration as described above, an increase in manufacturing cost associated with installation thereof can be suppressed.

Furthermore, in the present embodiment, the one-way clutch 42 is installed at the coupling part between the screw shaft 29 and the third gear 28, that is, the coupling part between the linear motion conversion mechanism 16 and the rotation transmission mechanism 17. Therefore, the screw shaft 29 becomes the only member that stops the rotational motion together with the stopping of the rearward motion of the piston 19, and the mitigation effect on an impact increases.

Note that in the present embodiment, the key groove 37 formed in the screw shaft 29 corresponds to the recess part, and the coupling member 35 provided with the leaf spring 38 corresponds to a first rotating portion. The screw shaft 29 in which the key groove 37 as the recess part is formed corresponds to a second rotating portion that meshes with the first rotating portion. Furthermore, in the present embodiment, the third gear 28 corresponds to a rotating component that directly transmits rotational torque to the linear motion conversion mechanism 16.

The one-way clutch 42 is a mechanism that transmits the mutual rotational torque between the electric motor 15 and the linear motion conversion mechanism 16. The one-way clutch 42 cuts off transmission of the rotational torque when the rotational torque in the separation direction in which the friction material 12A separates from the brake disc 12B as the rotating portion has a magnitude equal to or greater than a predetermined value. Therefore, in the present embodiment, the one-way clutch 42 corresponds to the torque transmission mechanism.

Second Embodiment

Figure 5:
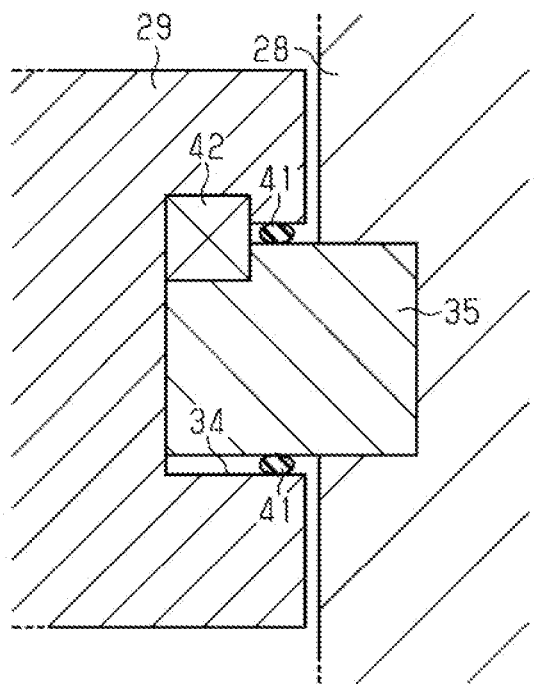
FIG. 5 is a cross-sectional view of a one-way clutch and a peripheral portion thereof in an electric braking device of a second embodiment.

Next, the second embodiment of the electric braking device will be described also with reference to FIG. 5. FIG. 5 illustrates a cross-sectional structure of the one-way clutch 42 and a peripheral portion thereof in the electric braking device of the second embodiment. Also in the present embodiment, the one-way clutch 42 is installed at the coupling part between the screw shaft 29 and the coupling member 35. On the other hand, in the present embodiment, together with the one-way clutch 42, an O-ring 41 is provided side by side with the coupling part between the screw shaft 29 and the coupling member 35.

In the present embodiment, even when the one-way clutch 42 is in a state of cutting off transmission of the rotational torque, the rotational torque through the O-ring 41 between the screw shaft 29 and the coupling member 35 is maintained. Therefore, installation of the O-ring 41 can increase the upper limit of the rearward-direction rotational torque that can be transmitted between the electric motor 15 and the linear motion conversion mechanism 16. Note that an elastic body other than the O-ring 41 that is installed between sliding surfaces of the screw shaft 29 and the coupling member 35 and generates sliding resistance on both the sliding surfaces may be installed in place of the O-ring 41.

Third Embodiment

Next, the third embodiment of the electric braking device will be described also with reference to FIGS. 6 to 9. The configurations that are present in the present embodiment and in common with the above embodiment are denoted by identical reference signs, and the detailed description thereof will be omitted.

<Configuration of Electric Braking Device 50>

Figure 6:
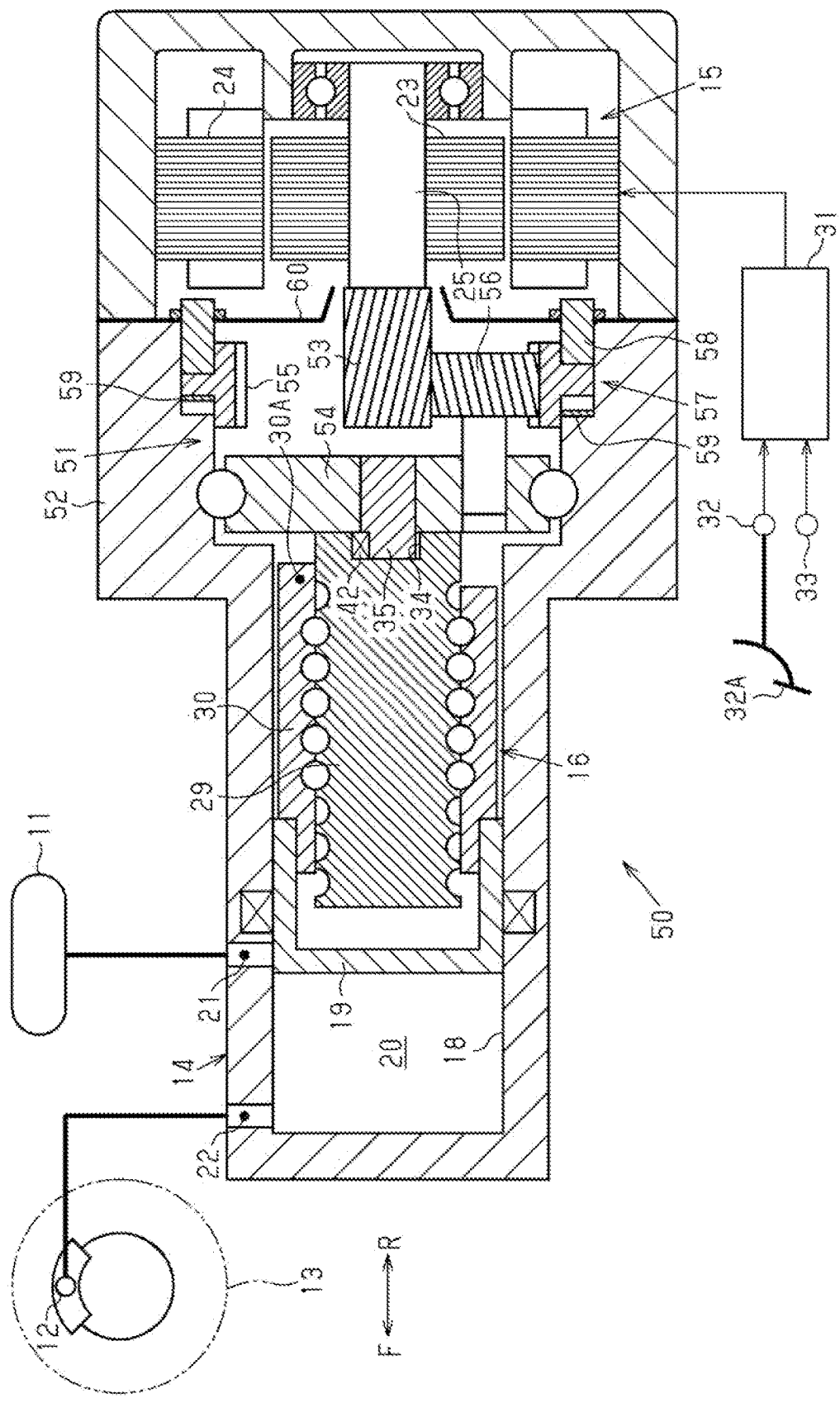
FIG. 6 is a view schematically illustrating a configuration of an electric braking device of a third embodiment.

As illustrated in FIG. 6, similarly to the electric braking device 10 of the first embodiment, an electric braking device 50 of the present embodiment includes the cylinder mechanism 14, the electric motor 15, and the linear motion conversion mechanism 16. However, in the electric braking device 50 of the present embodiment, the electric motor 15 and the linear motion conversion mechanism 16 are coupled via a planetary gear mechanism 51. In the electric braking device 50 of the present embodiment, the electric motor 15, the planetary gear mechanism 51, the linear motion conversion mechanism 16, and the cylinder mechanism 14 are coaxially disposed. Note that the electric braking device 50 includes a housing 52 that internally accommodates the planetary gear mechanism 51, the linear motion conversion mechanism 16, and the cylinder mechanism 14 and that is attached with the electric motor 15.

The planetary gear mechanism 51 has three rotating elements of a sun gear 53, a carrier 54, and a ring gear 55. The motor shaft 25 of the electric motor 15 is coupled to the sun gear 53 of the planetary gear mechanism 51 so as to rotate integrally. The screw shaft 29 of the linear motion conversion mechanism 16 is coupled to the carrier 54 of the planetary gear mechanism 51 so as to rotate integrally. Note that in the carrier 54, a planetary gear 56 that meshes with both the sun gear 53 and the ring gear 55 is rotatably installed as well as revolvably together with the carrier 54. Note that the ring gear 55 is installed in the housing 52 in a state where a certain amount of movement is permitted in the linear motion direction of the piston 19 in the cylinder 18.

<Configuration of One-Way Clutch 57>

The planetary gear mechanism 51 includes a one-way clutch 57 that switches between a state where rotation of the ring gear 55 is prohibited and a state where rotation of the ring gear 55 is permitted. The planetary gear mechanism 51 permits transmission of rotational torque between the electric motor 15 and the linear motion conversion mechanism 16 when the one-way clutch 57 is in a state of prohibiting rotation of the ring gear 55. On the other hand, the planetary gear mechanism 51 cuts off transmission of the rotational torque between the electric motor 15 and the linear motion conversion mechanism 16 when the one-way clutch 57 is in a state of permitting rotation of the ring gear 55.

The one-way clutch 57 includes the ring gear 55, a clutch plate 58, and a wave washer 59. The clutch plate 58 is a member having an annular shape disposed facing the ring gear 55 in a part in the rearward motion direction R relative to the ring gear 55 in the housing 52. The wave washer 59 is an elastic member that presses the ring gear 55 toward the clutch plate 58. Note that the clutch plate 58 is fixed to a partition wall 60 that defines an accommodating portion of the cylinder mechanism 14, the linear motion conversion mechanism 16, and the planetary gear mechanism 51 in the housing 52 and an attachment portion of the electric motor 15. Due to this, the clutch plate 58 is non-rotatably installed in the housing 52.

Figure 7:
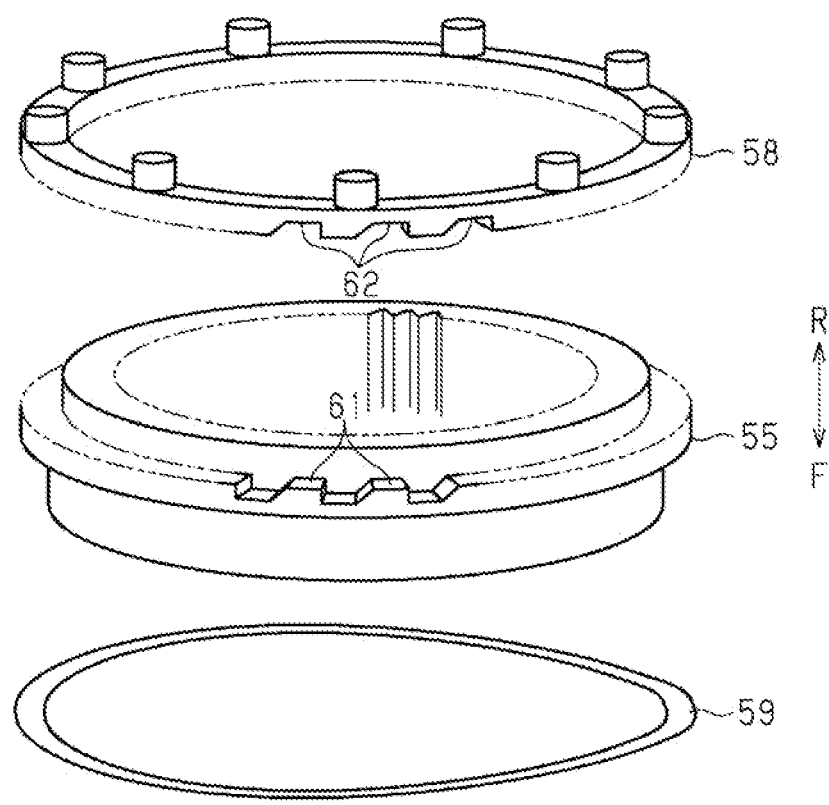
FIG. 7 is an exploded perspective view of a one-way clutch included in the electric braking device.

As illustrated in FIG. 7, a plurality of protrusion parts 61 protruding in a direction toward the clutch plate 58 are arranged at equal intervals in a circumferential direction in a part facing the clutch plate 58 in the ring gear 55. On the other hand, as many recess parts 62 as the protrusion parts 61 are arranged at equal intervals in the circumferential direction in a part facing the ring gear 55 in the clutch plate 58. The recess part 62 is formed in a shape with which the protrusion part 61 can be engaged. That is, the recess part 62 is formed in a shape in which the protrusion part 61 is mirror-inverted. Note that of both side surfaces of the protrusion part 61 and the recess part 62 in the circumferential direction of the ring gear 55 and the clutch plate 58, a surface positioned in the reverse rotation direction of the screw shaft 29 is a surface substantially perpendicular to the circumferential direction. On the other hand, of the both side surfaces, a surface positioned in the forward rotation direction of the screw shaft 29 is an inclined surface inclined with respect to the circumferential direction.

<Operations and Effects of Third Embodiment>

Next, the operations of the electric braking device 50 of the present embodiment will be described also with reference to FIGS. 8 and 9. The ring gear 55 when the piston 19 is stopped moves in the rearward motion direction R by a pressing force of the wave washer 59. Therefore, as illustrated in FIG. 8, the one-way clutch 57 at this time is in a state where the protrusion part 61 of the ring gear 55 and the recess part 62 of the clutch plate 58 are engaged with each other, and the rotation of the ring gear 55 is prohibited.

Here, when the electric motor 15 is driven so that the motor shaft 25 rotates in the forward rotation direction, the sun gear 53 of the planetary gear mechanism 51 rotates in the forward rotation direction. At this time, unless the ring gear 55 rotates, the rotational torque is transmitted from the sun gear 53 to the carrier 54. Then, the rotational torque in the forward rotation direction is also transmitted to the screw shaft 29 that rotates integrally with the carrier 54, and the piston 19 moves in the forward motion direction F. Due to this, a brake fluid in the liquid chamber 20 is applied with a pressing force, thereby generating a braking force on the wheel 13.

Figure 8:
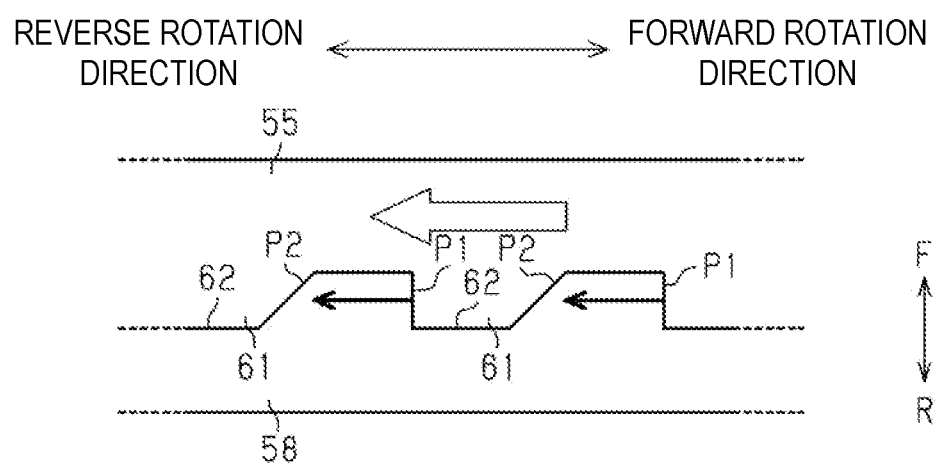
FIG. 8 is a view illustrating a state of a protrusion part and a recess part when applied with a rotational torque in a reverse rotation direction of a ring gear.

Note that the ring gear 55 at this time is applied with a rotational torque in the reverse rotation direction as indicated by a white arrow in FIG. 8. The clutch plate 58 receives, on a side surface P1 in the reverse rotation direction of the recess part 62, the rotational torque in the reverse rotation direction applied to the ring gear 55. As described above, the side surfaces P1 in the reverse rotation direction in the protrusion part 61 and the recess part 62 are surfaces substantially perpendicular to the circumferential direction. Therefore, even if the ring gear 55 is applied with the rotational torque in the reverse rotation direction, the state where the rotation of the ring gear 55 is prohibited by the engagement between the protrusion part 61 and the recess part 62 is maintained.

When the electric motor 15 loses power due to a power failure or the like during generation of the braking force, the piston 19 is pushed down and moves rearward by the liquid pressure of the liquid chamber 20. The linear motion of the piston 19 in the rearward motion direction R at this time is converted into a rotational motion by the linear motion conversion mechanism 16. Then, the carrier 54 rotates in the reverse rotation direction together with the screw shaft 29. Since the ring gear 55 at this time is in a state of being prohibited from rotation, the rotational torque is transmitted from the carrier 54 to the sun gear 53.

When moving rearward to the rearmost position, the piston 19 stops the rearward motion operation. On the other hand, each rotating component provided in the transmission path of the rotational torque between the electric motor 15 and the linear motion conversion mechanism 16 is toward continuous rotation due to inertia. In the planetary gear mechanism 51 at this time, the carrier 54 coupled to the linear motion conversion mechanism 16 is toward stopping of the rotation in the reverse rotation direction in response to the stopping of the rearward motion of the piston 19. On the other hand, the sun gear 53 coupled to the electric motor 15 is toward continuous rotation in the reverse rotation direction. As a result, the ring gear 55 is applied with the rotational torque in the forward rotation direction. That is, for the ring gear 55, the rotational torque in the forward rotation direction becomes the rotational torque in the separation direction in which the friction material 12A illustrated in FIG. 1 separates from the brake disc 12B, which is the rotating portion.

Figure 9:
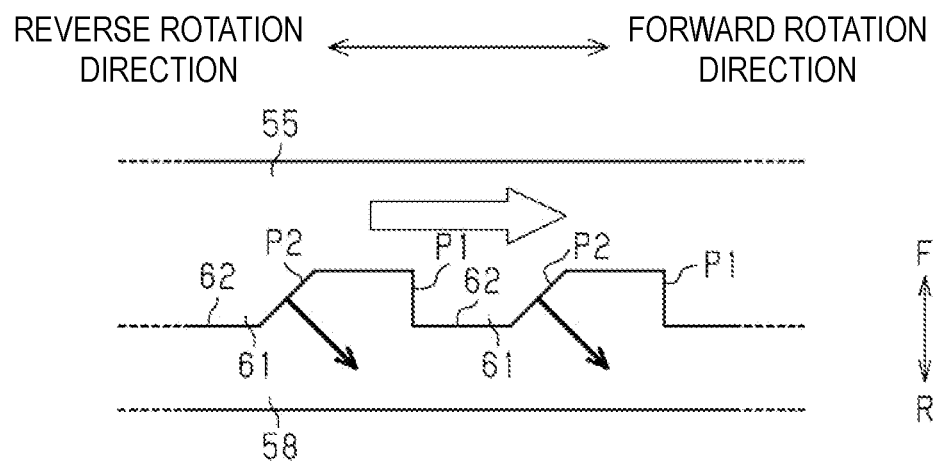
FIG. 9 is a view illustrating a state of the protrusion part and the recess part when applied with a rotational torque in a forward rotation direction of the ring gear.

As illustrated in FIG. 9, the clutch plate 58 at this time receives, on a side surface P2 in the forward rotation direction in the recess part 62, the rotational torque in the forward rotation direction applied to the ring gear 55. As described above, the side surfaces P2 in the forward rotation direction of the protrusion part 61 and the recess part 62 are inclined surfaces. Therefore, when the ring gear 55 is applied with the rotational torque in the forward rotation direction, a force pressing the ring gear 55 in the forward motion direction F is generated. That is, the protrusion part 61 and the recess part 62 are formed in a shape that converts the rotational torque in the forward rotation direction applied to the ring gear 55 into a drag force against the pressing force by the wave washer 59. Due to such drag force, when the ring gear 55 moves in the forward motion direction F against the pressing force of the wave washer 59, the engagement between the protrusion part 61 and the recess part 62 is released. When the engagement between the protrusion part 61 and the recess part 62 is released, the rotation of the ring gear 55 is permitted, and the torque transmission between the linear motion conversion mechanism 16 and the electric motor 15 through the planetary gear mechanism 51 is cut off. Therefore, the nut 30, the screw shaft 29, and the sun gear 53 become only members that stop the motion together with the stopping of the rearward motion of the piston 19. Therefore, according to the electric braking device 50 of the present embodiment, it is possible to mitigate the impact generated by power loss of the electric motor 15 during generation of the braking force.

Note that the magnitude of the rotational torque in the forward rotation direction when the engagement between the protrusion part 61 and the recess part 62 is released can be adjusted by a spring force of the wave washer 59 and an inclination angle of the inclined surface. In the present embodiment, the spring force of the wave washer 59 and the inclination angle of the inclined surface are set such that the engagement between the protrusion part 61 and the recess part 62 is released when the rearward motion of the piston 19 is stopped at the rearmost position after the power loss of the electric motor 15. That is, the spring force and the inclination angle are set such that when applied with the rearward-direction rotational torque equal to or greater than the predetermined value TR, the drag force becomes larger than the wave washer 59, and the engagement between the protrusion part 61 and the recess part 62 is released.

In the present embodiment, the planetary gear mechanism 51 corresponds to the torque transmission mechanism. The ring gear 55 of the planetary gear mechanism 51 is the next rotating element. That is, the ring gear 55 permits transmission of the rotational torque between the electric motor 15 and the linear motion conversion mechanism 16 when in a state where rotation is prohibited. The ring gear 55 is brought into a state of being permitted to rotate when the rotational torque in the separation direction in which the friction material separates from the rotating portion has a magnitude equal to or greater than a predetermined value. The ring gear 55 cuts off the transmission of the rotational torque between the electric motor 15 and the linear motion conversion mechanism 16 when the rotation is brought into a state of being permitted. Furthermore, in the present embodiment, the ring gear 55 corresponds to a first clutch portion, and the clutch plate 58 corresponds to a second clutch portion.

Other Embodiments

The above embodiments can be modified and carried out as follows. The present embodiment and the following modifications can be carried out in combination with each other within a range not technically contradictory.

<Control of Electric Motor 15>

In the above embodiments, the braking force of the wheel 13 is controlled by adjusting the forward-direction rotational torque generated by the electric motor 15. The rearward motion operation of the piston 19 in the cylinder 18 when the braking force is reduced is performed by using the liquid pressure of the liquid chamber 20 as a thrust force. On the other hand, the electric braking device 10 provided with the one-way clutch 42 as described above can perform the rearward motion operation of the piston 19 using the power of the electric motor 15 by controlling the electric motor 15 in the following aspect.

When a rearward-direction rotational torque is transmitted from the electric motor 15 to the linear motion conversion mechanism 16, the rearward-direction rotational torque is converted into a linear motion in the rearward motion direction R by the linear motion conversion mechanism 16. However, the electric braking device 10 is provided with the one-way clutch 42 that cuts off the transmission of the rotational torque when applied with the rearward-direction rotational torque equal to or greater than the predetermined value TR. When controlling the electric motor 15 in a range in which the rearward-direction rotational torque applied to the one-way clutch 42 becomes less than the predetermined value TR, the electric braking device 10 provided with the one-way clutch 42 can perform the rearward motion operation of the piston 19 using the power of the electric motor 15. Note that the rearward motion operation of the piston 19 by the power of the electric motor 15 is preferably performed when the piston 19 is moved between the initial position and the rearmost position or when the piston 19 is rapidly moved back.

<Configuration of Linear Motion Conversion Mechanism 16>

The linear motion conversion mechanism 16 may be configured such that the screw shaft 29 linearly moves in response to the rotation of the nut 30. In this case, the nut 30 is coupled to the third gear 28 so as to rotate integrally, and the screw shaft 29 is coupled to the piston 19 so as to linearly move integrally. Even in such case, in terms of mitigating the impact generated by the power loss of the electric motor 15, it is desirable to install a one-way clutch in the coupling part between the nut 30 and the third gear 28.

<Configuration of Rotation Transmission Mechanism 17>

The configuration of the rotation transmission mechanism 17 that transmits the rotational motion of the electric motor 15 to the linear motion conversion mechanism 16 may be changed. Examples of the rotation transmission mechanism 17 other than the above include a bevel gear mechanism, a planetary gear mechanism, and a winding transmission mechanism. The rotation transmission mechanism 17 may be omitted, and the motor shaft 25 may be directly coupled to the linear motion conversion mechanism 16.

<Configuration of One-Way Clutch of First and Second Embodiments>

A one-way clutch of a type other than the above, such as a sprag type or a cam type, may be adopted. The one-way clutch may be provided in a part other than the above in the transmission path of the rotational torque between the electric motor 15 and the linear motion conversion mechanism 16. For example, the one-way clutch may be provided at a coupling part between the motor shaft 25 and the first gear 26 or a coupling part between the motor shaft 25 and the rotor 23.

<Configuration of One-Way Clutch 57 of Third Embodiment>

The number of the protrusion parts 61 and the recess parts 62 may each be 1 or more. The numbers of the protrusion parts 61 and the number of the recess parts 62 may be different from each other.

In place of installing the ring gear 55 movably in the linear motion direction of the piston 19 in the cylinder 18, the clutch plate 58 may be installed movably in the linear motion direction. The wave washer 59 in that case may be installed so as to press the clutch plate 58 in the forward motion direction F.

The first clutch portion provided with the protrusion part 61 may be configured as a component separate from the ring gear 55.

The shapes of the protrusion part 61 and the recess part 62 may be appropriately changed.

A part facing the ring gear 55 in the clutch plate 58 may be provided with a protrusion part protruding in a direction toward the ring gear 55, and a part facing the clutch plate 58 of the ring gear 55 may be provided with a recess part with which the protrusion part is engaged. In this case, the clutch plate 58 corresponds to the first clutch portion, and the ring gear 55 corresponds to the second clutch portion.

In place of the wave washer 59, an elastic member such as a coil spring may be provided.

<Configuration of Planetary Gear Mechanism 51>

In the planetary gear mechanism 51, a combination of a rotating element coupled to the electric motor 15, a rotating element coupled to the linear motion conversion mechanism 16, and a rotating element whose rotation is prohibited or permitted by the one-way clutch 57 may be arbitrarily changed.

<Configuration of Control Unit 31>

The control unit 31 can be configured as one or more processors operating in accordance with a computer program, one or more dedicated hardware circuits such as dedicated hardware for executing at least part of various types of processing, or a circuit including a combination of them. Examples of the dedicated hardware include an ASIC, which is an application specific integrated circuit. The processor includes a CPU and a memory such as a RAM and a ROM, and the memory stores a program code or a command configured to cause the CPU to execute processing. The memory, that is, a storage medium, includes any available medium that can be accessed by a general-purpose or dedicated computer.

The invention claimed is:

1. An electric braking device that generates a braking force on a vehicle by transmitting a rotational torque generated by an electric motor to a linear motion conversion mechanism, converting the rotational torque into a propulsive force in a linear direction of a piston provided in a cylinder by the linear motion conversion mechanism, and pressing a friction material that operates in response to the propulsive force of the piston against a rotating portion that rotates together with a wheel of the vehicle, the electric braking device comprising:
    a torque transmission mechanism that mutually transmits the rotational torque between the electric motor and the linear motion conversion mechanism, the torque transmission mechanism cutting off transmission of the rotational torque when the rotational torque in a separation direction in which the friction material separates from the rotating portion has a magnitude equal to or greater than a predetermined value.

2. The electric braking device according to claim 1, wherein
    the torque transmission mechanism includes a first rotating portion and a second rotating portion that mesh with each other, a recess part is formed in the first rotating portion, and a leaf spring is provided in the second rotating portion, and
    the rotational torque can be transmitted when the leaf spring is engaged with the recess part, and engagement of the leaf spring with the recess part is released when the rotational torque in the separation direction has a magnitude equal to or greater than the predetermined value.

3. The electric braking device according to claim 2, further comprising a control unit that controls the rotational torque in the separation direction generated by the electric motor within a range less than the predetermined value.

4. The electric braking device according to claim 1, wherein the torque transmission mechanism is provided between the linear motion conversion mechanism and a rotating component that directly transmits the rotational torque to the linear motion conversion mechanism.

5. The electric braking device according to claim 4, further comprising a control unit that controls the rotational torque in the separation direction generated by the electric motor within a range less than the predetermined value.

6. The electric braking device according to claim 1, wherein the torque transmission mechanism includes a rotating element that permits transmission of the rotational torque between the electric motor and the linear motion conversion mechanism when rotation is prohibited, and is brought into a state where rotation is permitted and cuts off transmission of the rotational torque between the electric motor and the linear motion conversion mechanism when the rotational torque in the separation direction has a magnitude equal to or greater than the predetermined value.

7. The electric braking device according to claim 6, wherein the torque transmission mechanism includes
    a first clutch portion and a second clutch portion facing each other,
    a protrusion part provided at a part facing the second clutch portion in the first clutch portion and protruding in a direction toward the second clutch portion,
    a recess part provided in the second clutch portion and engaged with the protrusion part, and
    an elastic member that presses one of the first clutch portion and the second clutch portion toward an other,
    one of the first clutch portion and the second clutch portion rotates integrally with the rotating element, and the other is non-rotatably installed in a housing accommodating the torque transmission mechanism,
    at least one of the protrusion part and the recess part is formed in a shape that converts a rotational torque in the separation direction into a drag force against a pressing force by the elastic member,
    rotation of the rotating element is prohibited when the recess part is engaged with the protrusion part by a pressing force of the elastic member, and
    the drag force becomes larger than the pressing force and engagement between the protrusion part and the recess part is released when the rotational torque in the separation direction has a magnitude equal to or greater than the predetermined value.

8. The electric braking device according to claim 7, further comprising a control unit that controls the rotational torque in the separation direction generated by the electric motor within a range less than the predetermined value.

9. The electric braking device according to claim 6, wherein the torque transmission mechanism is a planetary gear mechanism provided coaxially between the motor and the linear motion conversion mechanism, and the rotating element is a ring gear of the planetary gear mechanism.

10. The electric braking device according to claim 9, further comprising a control unit that controls the rotational torque in the separation direction generated by the electric motor within a range less than the predetermined value.

11. The electric braking device according to claim 6, further comprising a control unit that controls the rotational torque in the separation direction generated by the electric motor within a range less than the predetermined value.

12. The electric braking device according to claim 1, further comprising a control unit that controls the rotational torque in the separation direction generated by the electric motor within a range less than the predetermined value.

* * * * *